United States Patent
Hong et al.

(10) Patent No.: US 12,499,964 B2
(45) Date of Patent: Dec. 16, 2025

(54) MEMORY DEVICE FOR PERFORMING BAD BLOCK CHECK, METHOD OF OPERATING MEMORY DEVICE, AND METHOD OF OPERATING STORAGE CONTROLLER COMMUNICATING WITH MEMORY DEVICE

(71) Applicant: SK hynix Inc., Icheon-si Gyeonggi-do (KR)

(72) Inventors: Sung Hwa Hong, Icheon-si Gyeonggi-do (KR); Tae Heui Kwon, Icheon-si Gyeonggi-do (KR); Byung Goo Cho, Icheon-si Gyeonggi-do (KR)

(73) Assignee: SK hynix Inc., Icheon-si (KR)

( * ) Notice: Subject to any disclaimer, the term of this patent is extended or adjusted under 35 U.S.C. 154(b) by 32 days.

(21) Appl. No.: 18/409,265

(22) Filed: Jan. 10, 2024

(65) Prior Publication Data

US 2025/0014668 A1  Jan. 9, 2025

(30) Foreign Application Priority Data

Jul. 4, 2023  (KR) .................. 10-2023-0086452

(51) Int. Cl.
*G11C 29/50* (2006.01)
(52) U.S. Cl.
CPC .................. *G11C 29/50004* (2013.01)
(58) Field of Classification Search
CPC ............ G11C 29/50004; G11C 2029/1202
See application file for complete search history.

(56) References Cited

U.S. PATENT DOCUMENTS

| | | | | |
|---|---|---|---|---|
| 2007/0195610 A1* | 8/2007 | Park | ................. | G11C 16/16 |
| | | | | 365/185.29 |
| 2009/0244975 A1* | 10/2009 | Kang | ................. | G11C 29/832 |
| | | | | 365/185.11 |
| 2011/0063918 A1* | 3/2011 | Pei | ................. | G06F 11/1072 |
| | | | | 365/185.11 |
| 2015/0279453 A1* | 10/2015 | Fujiwara | .............. | H10B 10/18 |
| | | | | 365/154 |
| 2018/0307431 A1* | 10/2018 | Gunnam | ............... | G11C 29/00 |
| 2019/0385694 A1* | 12/2019 | Chen | .................. | G11C 29/44 |
| 2023/0260582 A1* | 8/2023 | Pachamuthu | ...... | G11C 16/3445 |
| | | | | 365/185.22 |

(Continued)

FOREIGN PATENT DOCUMENTS

KR  1020150016797 A  2/2015
KR  1020190076228 A  7/2019

*Primary Examiner* — Albert Decady
*Assistant Examiner* — Enamul M Kabir
(74) *Attorney, Agent, or Firm* — WILLIAM PARK AND ASSOCIATES LTD.

(57) ABSTRACT

Provided herein may be a memory device for performing a bad block check, a method of operating the memory device, and a method of operating a storage controller communicating with the memory device. The memory device may include a first area including a first memory cell, a second area including a second memory cell, the first memory cell and the second memory cell coupled to an identical word line, and a control circuit configured to perform a first operation on the first area and a second operation on the second area and configured to store a first result indicating whether the first operation has succeeded and a second result indicating whether the second operation has succeeded.

20 Claims, 9 Drawing Sheets

(56) References Cited

U.S. PATENT DOCUMENTS

| | | | |
|---|---|---|---|
| 2023/0290392 A1* | 9/2023 | Chen | G11C 8/12 |
| 2023/0315330 A1* | 10/2023 | Li | G06F 3/0655 |
| 2024/0036740 A1* | 2/2024 | Liu | G11C 16/3459 |

* cited by examiner

MEMORY DEVICE FOR PERFORMING BAD BLOCK CHECK, METHOD OF OPERATING MEMORY DEVICE, AND METHOD OF OPERATING STORAGE CONTROLLER COMMUNICATING WITH MEMORY DEVICE

CROSS-REFERENCE TO RELATED APPLICATION

The present application claims priority under 35 U.S.C. § 119 (a) to Korean patent application number 10-2023-0086452 filed on Jul. 4, 2023, in the Korean Intellectual Property Office, the entire disclosure of which is incorporated by reference herein.

BACKGROUND

1. Technical Field

Various embodiments of the present disclosure generally relate to a memory device, and more particularly to a memory device for performing a bad block check, a method of operating the memory device, and a method of operating a storage controller communicating with the memory device.

2. Related Art

A storage device is a device which stores data under the control of a host device, such as a computer or a smartphone. The storage device may include a memory device in which data is stored and a storage controller which controls the memory device. Memory devices are classified into a volatile memory device and a non-volatile memory device.

The non-volatile memory device may include a bad block in which a normal operation is not guaranteed. The non-volatile memory device may designate a memory block in which a normal operation is not guaranteed during operation as a bad block.

SUMMARY

An embodiment of the present disclosure may provide for a memory device. The memory device may include a first area including a first memory cell, a second area including a second memory cell, the first memory cell and the second memory cell coupled to an identical word line, and a control circuit configured to perform a first operation on the first area and a second operation on the second area and configured to store a first result indicating whether the first operation has succeeded and a second result indicating whether the second operation has succeeded.

An embodiment of the present disclosure may provide for a method of operating a storage controller, the storage controller communicating with a non-volatile memory device including a target block. The method may include sending a first request for a first area of the target block to the non-volatile memory device, sending a second request for a second area of the target block to the non-volatile memory device, and determining whether to process the target block as a bad block, based on a first result indicating whether a first operation corresponding to the first request has succeeded and a second result indicating whether a second operation corresponding to the second request has succeeded, wherein the first area includes memory cells coupled to a first pass gate group among memory cells of the target block, the second area includes memory cells coupled to a second pass gate group among the memory cells of the target block, and a plurality of pass gates in the first pass gate group and a plurality of pass gates in the second pass gate group are coupled to identical word lines, respectively.

An embodiment of the present disclosure may provide for a method of operating a memory device, the memory device including a memory block including a first area and a second area. The method may include performing a first operation corresponding to the first area, storing a first result indicating whether the first operation has succeeded, after storing the first result, performing a second operation corresponding to the second area, storing a second result indicating whether the second operation has succeeded, and processing at least one of the first area and the second area as a fail area based on the first and second results, wherein the first area includes memory cells coupled to a first pass gate group among memory cells of the memory block, the second area includes memory cells coupled to a second pass gate group among the memory cells of the memory block, and a plurality of pass gates in the first pass gate group and a plurality of pass gates in the second pass gate group are coupled to identical word lines, respectively.

DETAILED DESCRIPTION

Specific structural or functional descriptions in the embodiments according to the concept of the present disclosure introduced in this specification or application are only for description of the embodiments according to the concept of the present disclosure. The embodiments according to the concept of the present disclosure may be practiced in various forms and should not be construed as being limited to the embodiments described in the specification or application.

Additionally, terms such as "unit" and "module" or the functional blocks depicted in the accompanying drawings may be implemented in the form of software configuration, hardware configuration, or a combination thereof. In order to clearly explain the technical spirit of the present disclosure, detailed explanations of the same components will be omitted.

Various embodiments of the present disclosure are directed to a memory device for performing a bad block check.

Figure 1:
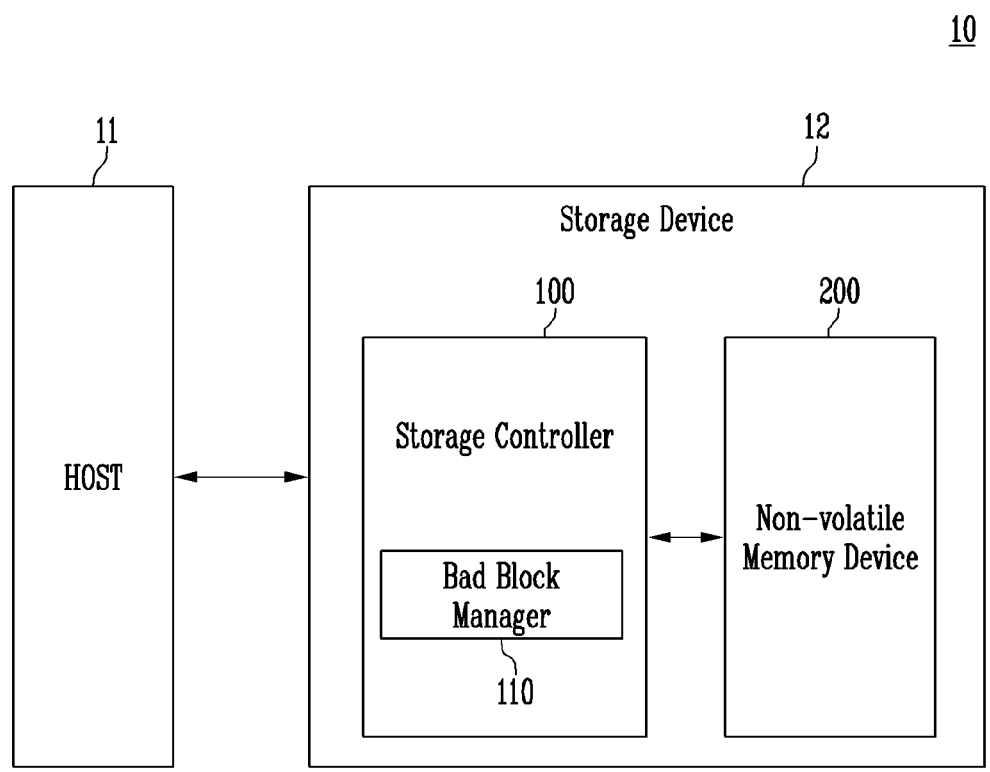
FIG. 1 is a block diagram illustrating a storage system according to an embodiment of the present disclosure.

FIG. 1 is a block diagram illustrating a storage system according to an embodiment of the present disclosure.

Referring to FIG. 1, a storage system 10 may include a host 11 and a storage device 12. In some embodiments, the storage system 10 may be a computing system configured to process various types of information, such as a personal computer, a notebook, a laptop, a server, a workstation, a tablet personal computer (PC), a smartphone, a digital camera, and a black box.

The host 11 may control the overall operation of the storage system 10. For example, the host 11 may store data in the storage device 12 or may read data stored in the storage device 12. For example, the host 11 may provide write data to the storage device 12 or may request read data stored in the storage device 12 from the storage device 12.

The storage device 12 may include a storage controller 100 and a non-volatile memory device 200. The non-volatile memory device 200 may store data. The storage controller 100 may store data in the non-volatile memory device 200 through a program operation or may read data stored in the non-volatile memory device 200 through a read operation. The non-volatile memory device 200 may be operated under the control of the storage controller 100. For example, the storage controller 100 may store data in the non-volatile memory device 200 or may read data stored in the non-volatile memory device 200 based on a command CMD determining the operation and an address ADD determining the location of data.

The non-volatile memory device 200 may include a plurality of memory blocks. Each of the plurality of memory blocks may include a first area and a second area. For example, the first area may include memory cells located in the left portion of the corresponding memory block. The second area may include memory cells located in the right portion of the corresponding memory block. Detailed descriptions of the first area and the second area will be disclosed later with reference to FIG. 4.

The non-volatile memory device 200 may determine whether to apply a voltage to the first area or the second area in response to a first control signal and a second control signal. For example, the non-volatile memory device 200 may block a voltage application to the first area in response to the first control signal. The non-volatile memory device 200 may block a voltage application to the second area in response to the second control signal. Accordingly, the non-volatile memory device 200 may perform a read operation and a program operation on any one of the first area and the second area.

In some embodiments, the non-volatile memory device 200 may be, but is not limited to, a NAND flash memory. Also, the non-volatile memory device 200 may be one of various storage devices in which stored data can be retained even when power supply is interrupted, for example, phase-change random access memory (PRAM), magnetic RAM (MRAM), resistive RAM (RRAM), and ferroelectric RAM (FRAM).

The storage controller 100 may include a bad block manager 110. The bad block manager 110 may perform a bad block check on the non-volatile memory device 200. The bad block check may be an operation that determines whether at least one of a first area and a second area in a target block of the non-volatile memory device 200 fails. A fail area may refer to an area in which the reliability of memory cells in the corresponding area is not guaranteed, thus preventing a normal operation from being performed. The storage controller 100 might not perform a read operation or a program operation on the fail area. The storage controller 100 may output a signal for blocking a voltage application to the fail area. When both the first area and the second area are determined to have failed, the target block may be processed as a bad block.

The bad block manager 110 may perform a bad block check on a target block suspected of being a bad block, among memory blocks in the non-volatile memory device 200. For example, when an error occurs in a read operation performed on a target block even though a read retry operation is performed on the target block in which uncorrectable error correction codes (UECC) occur, the bad block manager 110 may perform the bad block check on the target block. Detailed description thereof will be made later with reference to FIG. 5. Furthermore, when the program operation on the target block has failed, the bad block manager 110 may perform an erase operation on the target block and may perform a bad block check on the target block. Detailed description thereof will be made later with reference to FIG. 6.

Figure 2:
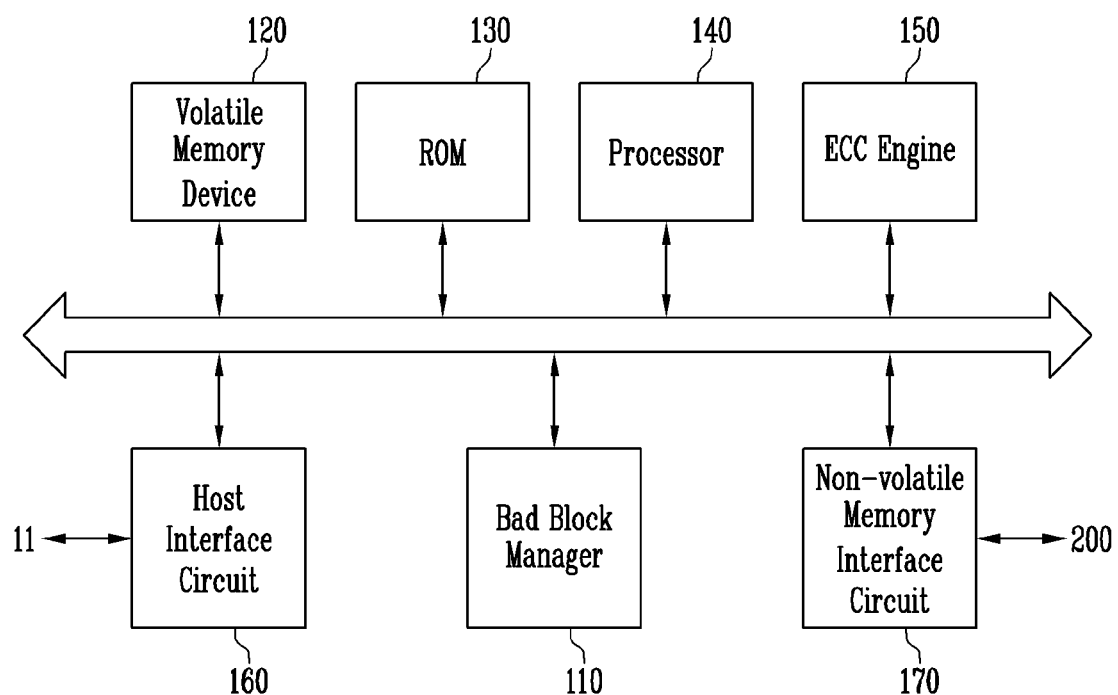
FIG. 2 is a detailed block diagram of a storage controller of FIG. 1 according to an embodiment of the present disclosure.

FIG. 2 is a detailed block diagram of the storage controller of FIG. 1 according to an embodiment of the present disclosure.

Referring to FIGS. 1 and 2, the storage controller 100 may communicate with the host 11 and the non-volatile memory device 200. The storage controller 100 may include a bad block manager 110, a volatile memory device 120, a read only memory (ROM) 130, a processor 140, an error correction code (ECC) engine 150, a host interface circuit 160, and a non-volatile memory interface circuit 170.

The bad block manager 110 may send a first request and a second request to the non-volatile memory device 200. The first request may indicate the performance of a first operation on a first area. The first request may include a second control signal for blocking a voltage application to the second area. The second request may indicate the performance of a second operation on a second area. The second request may include a first control signal for blocking a voltage application to the first area. The first operation may be a read operation or a program operation. The second operation may be a read operation or a program operation.

In some embodiments, when a read retry operation on a target block fails, the bad block manager 110 may send a first request to perform a read operation on the first area and a second request to perform a read operation on the second area. When a program operation on the target block fails, the bad block manager 110 may send a first request to perform a program operation on the first area and a second request to perform a program operation on the second area after an erase operation has been performed on the target block.

The bad block manager 110 may send a request to fetch a first result and a second result to the non-volatile memory device 200. The first result may indicate whether the first operation has succeeded. The second result may indicate whether the second operation has succeeded.

Based on the first result and the second result, the bad block manager 110 may determine whether to process at least one of the first area and the second area as a fail area.

For example, when the first result indicates a successful first operation and the second result indicates a failed second operation, the bad block manager 110 may process the second area as a fail area. When the first result indicates a failed first operation and the second result indicates a successful second operation, the bad block manager 110 may process the first area as a fail area. When the first result indicates a failed first operation and the second result indicates a failed second operation, the bad block manager 110 may process both the first area and the second area as fail areas. That is, the target block may be processed as a bad block.

The storage controller 100 may perform neither a read operation nor a program operation on an area processed as the fail area in the target block. The storage controller 100 may perform a read operation and a program operation on an area that is not processed as a fail area in the target block.

In some embodiments, the storage controller 100 may transmit a control signal for blocking a voltage application to the area processed as the fail area. For example, when the first area is processed as the fail area, the storage controller 100 may transmit a first control signal for blocking a voltage application to the first area during an operation on the target block. When the second area is processed as the fail area, the storage controller 100 may transmit a second control signal for blocking a voltage application to the second area during an operation on the target block.

The volatile memory device 120 may be used as a main memory, a cache memory, or a working memory of the storage controller 100. For example, the volatile memory device 120 may be implemented as a static RAM (SRAM), a dynamic RAM (DRAM), or the like.

The ROM 130 may be used as read-only memory that stores information required for the operation of the storage controller 100. The processor 140 may control the overall operation of the storage controller 100. The ECC engine 150 may detect errors in the data read from the non-volatile memory device 200 and may correct the errors. For example, the ECC engine 150 may have a certain level of error correction capability. For data having an error level exceeding the error correction capability (e.g., the number of flipped bits), the ECC engine 150 may process the data as uncorrectable data.

The storage controller 100 may communicate with the host 11 through the host interface circuit 160. In some embodiments, the host interface circuit 160 may be implemented as at least one of various interfaces, such as a serial ATA (SATA) interface, a peripheral component interconnect express (PCIe) interface, a serial attached SCSI (SAS) interface, a non-volatile memory express (NVMe) interface, and a universal flash storage (UFS) interface.

The storage controller 100 may communicate with the non-volatile memory device 200 through the non-volatile memory interface circuit 170. In some embodiments, the non-volatile memory interface circuit 170 may be implemented based on a NAND interface.

Figure 3:
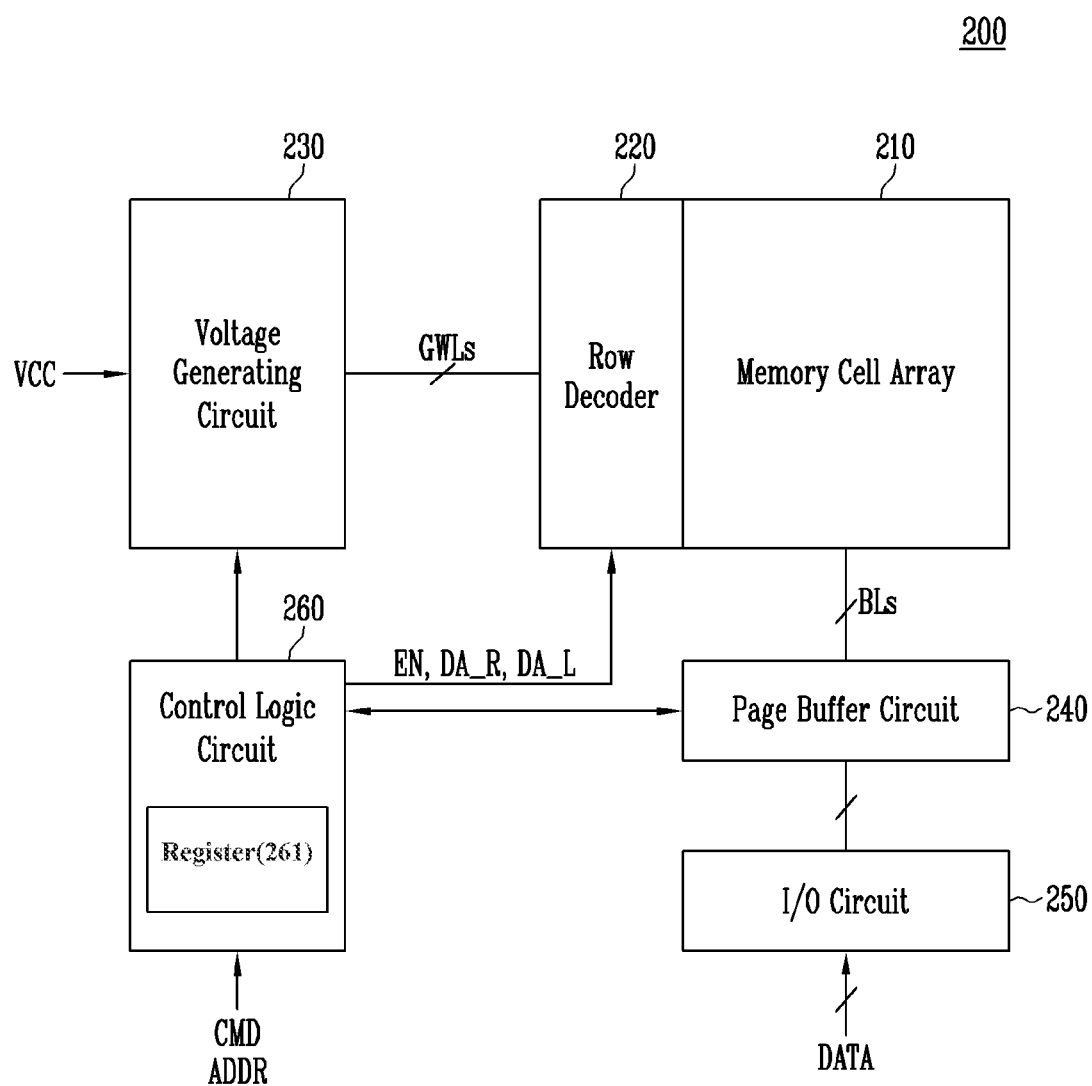
FIG. 3 is a detailed block diagram of a non-volatile memory device of FIG. 1 according to an embodiment of the present disclosure.

FIG. 3 is a detailed block diagram of the non-volatile memory device of FIG. 1 according to an embodiment of the present disclosure.

In some embodiments, the non-volatile memory device 200 may be a non-volatile memory device based on a NAND flash memory. However, the scope of the present disclosure is not limited thereto, and the non-volatile memory device 200 may be any one of various types of memory devices, such as DRAM, SRAM, PRAM, MRAM, RRAM, and FRAM.

Referring to FIG. 3, the non-volatile memory device 200 may include a memory cell array 210, a row decoder 220, a voltage generating circuit 230, a page buffer circuit 240, an input/output (I/O) circuit 250, and a control logic circuit 260.

The memory cell array 210 may include a plurality of memory blocks. Each of the plurality of memory blocks may be divided into a first area and a second area. For convenience of illustration, although the row decoder 220 is illustrated as being located to the left of the memory cell array 210 in FIG. 3, the first area may include memory cells located on the left side of the row decoder 220. The second area may include memory cells located on the right side of the row decoder 220.

In an embodiment, the row decoder 220, the voltage generating circuit 230, the page buffer circuit 240, and the input/output circuit 250 may be collectively referred to as a peripheral circuit. The peripheral circuit may drive the memory cell array 210 under the control of the control logic circuit 260. The peripheral circuit may drive the memory cell array 210 to perform a program operation, a read operation, or an erase operation.

The row decoder 220 may be coupled to the memory cell array 210 through word lines. The row decoder 220 may select one of the word lines under the control of the control logic circuit 260. The row decoder 220 may transfer voltages, received through global word lines GWLs, to the memory cells through the word lines.

Also, the row decoder 220 may receive an enable signal EN, a first control signal DA_L, and a second control signal DA_R from the control logic circuit 260. The row decoder 220 may determine whether to apply a voltage to one of the first area and the second area of the selected word line in response to the first control signal DA_L and the second control signal DA_R. The first control signal DA_L may block a voltage application to the first area. The second control signal DA_R may block a voltage application to the second area.

The voltage generating circuit 230 may generate various voltages required to operate the non-volatile memory device 200. For example, based on a supply voltage VCC, the voltage generating circuit 230 may generate various voltages, such as a plurality of program voltages, a plurality of pass voltages, a plurality of verify voltages, a plurality of select read voltages, a plurality of unselect read voltages, a plurality of erase voltages, and a plurality of erase verify voltages. The voltage generating circuit 230 may output the generated voltages to the row decoder 220 through the global word lines GWLs.

The page buffer circuit 240 may be coupled to the memory cell array 210 through bit lines BLs. The page buffer circuit 240 may read data stored in the memory cell array 210 by sensing voltage changes in the bit lines BLs and may temporarily store the read data. The page buffer circuit 240 may receive the data from the input/output circuit 250 and may store the data in the memory cell array 210 by controlling the bit lines BLs based on the received data.

The input/output circuit 250 may exchange data DATA with an external device (e.g., a storage controller). For example, the input/output circuit 250 may receive the data DATA from the external device and may transfer the received data DATA to the page buffer circuit 240. The input/output circuit 250 may receive the data DATA from the page buffer circuit 240 and may transfer the received data to the external device.

The control logic circuit 260 may control the overall operation of the non-volatile memory device 200. For example, the control logic circuit 260 may receive a command CMD and an address ADDR from the external device (e.g., the storage controller) and may control the peripheral circuit by generating control signals in response to the command CMD and the address ADDR.

The control logic circuit 260 may perform a first operation on the first area and a second operation on the second area based on the command CMD and the address ADDR received from the storage controller. For example, the control logic circuit 260 may transmit the enable signal EN and the second control signal DA_R to the row decoder 220 while performing the first operation on the first area. The control logic circuit 260 may transmit the enable signal EN and the first control signal DA_L to the row decoder 220 while performing the second operation on the second area.

The control logic circuit 260 may include a register 261. The register 261 may store a first result and a second result. In response to a request received from the storage controller, the control logic circuit 260 may output the first result and the second result, stored in the register 261, to the storage controller. In FIG. 3, although the control logic circuit 260 is illustrated as including the register 261, the present disclosure is not limited thereto, and the register 261 may be a separate component that is not included in the control logic circuit 260.

Figure 4:
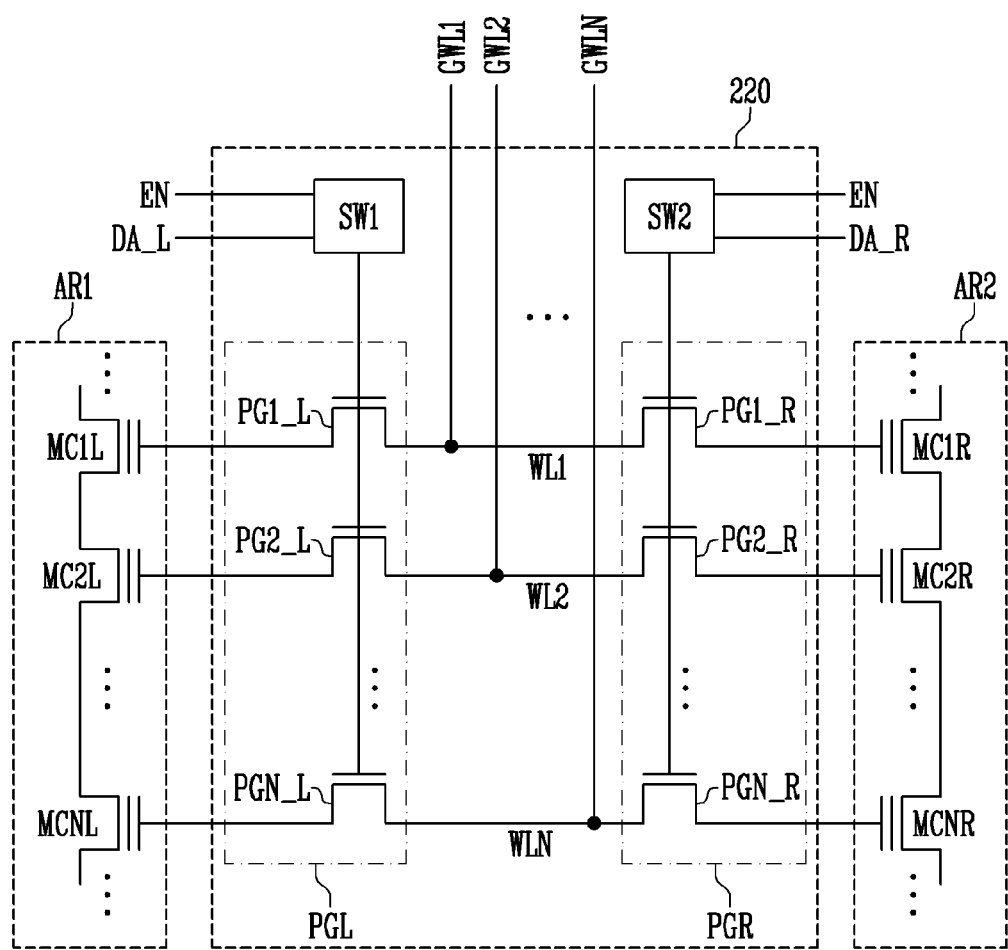
FIG. 4 is a circuit diagram illustrating a memory block including a first area and a second area.

FIG. 4 is a circuit diagram illustrating a memory block including a first area and a second area.

Referring to FIG. 4, a first area AR1 and a second area AR2 of the memory block and a row decoder 220 are illustrated.

Each of the first area AR1 and the second area AR2 may include memory cells of the memory block. The first area AR1 may be arranged at a first location with respect to the row decoder 220, and the second area AR2 may be arranged at a second location with respect to the row decoder 220. For example, the first area AR1 may be arranged to the left of the row decoder 220, and the second area AR2 may be arranged to the right of the row decoder 220.

The first area AR1 may include first to N-th memory cells MC1L to MCNL, and the second area AR2 may include first to N-th memory cells MC1R to MCNR. The first to N-th memory cells MC1L to MCNL of the first area AR1 and the first to N-th memory cells MC1R to MCNR of the second area AR2 may be coupled to identical word lines, respectively. In other words, the first memory cells MC1L of the first areas and the first memory cells MC1R of the second areas may be coupled to the same first word line WL1, the second memory cells MC2L of the first areas of the first and second areas MC2L and the second memory cells MC2R of the second areas may be coupled to the same second word line WL2, and so on. N may be a natural number greater than 1.

For example, the first memory cell MC1L of the first area AR1 and the first memory cell MC1R of the second area AR2 may be coupled to a first word line WL1. The second memory cell MC2L of the first area AR1 and the second memory cell MC2R of the second area AR2 may be coupled to a second word line WL2. The N-th memory cell MCNL of the first area AR1 and the N-th memory cell MCNR of the second area AR2 may be coupled to an N-th word line WLN.

The first to N-th word lines WL1 to WLN may be coupled to first to N-th global word lines GWL1 to GWLN, respectively. For example, the first word line WL1 may be coupled to the first global word line GWL1, the second word line WL2 may be coupled to the second global word line GWL2, and the N-th word line WLN may be coupled to the N-th global word line GWLN.

The first to N-th global word lines GWL1 to GWLN may transfer voltages to the first to N-th word lines WL1 to WLN, respectively. The first to N-th word lines WL1 to WLN may transfer the applied voltages to the first to N-th memory cells MC1L to MCNL of the first area AR1, respectively, through a first pass gate group PGL. Further, the first to N-th word lines WL1 to WLN may transfer the applied voltages to the first to N-th memory cells MC1R to MCNR of the second area AR2, respectively, through a second pass gate group PGR.

The row decoder 220 may include the first pass gate group PGL, the second pass gate group PGR, a first switch SW1, and a second switch SW2.

The first pass gate group PGL may include first to N-th pass gates PG1_L to PGN_L. The first to N-th pass gates PG1_L to PGN_L may be coupled to the first to N-th memory cells MC1L to MCNL, respectively, in the first area AR1.

The first switch SW1 may be coupled to each of the pass gates PG1_L to PGN_L of the first pass gate group PGL. The first switch SW1 may turn off each of the pass gates PG1_L to PGN_L of the first pass gate group PGL based on the enable signal EN and the first control signal DA_L. For example, the first switch SW1 may be a high-voltage switch.

When receiving only the enable signal EN, the first switch SW1 may turn on each of the pass gates PG1_L to PGN_L of the first pass gate group PGL. As each of the pass gates PG1_L to PGN_L of the first pass gate group PGL is turned on, the voltages applied to the global word lines GWL1 to GWLN may be transferred to the memory cells MC1L to MCNL of the first area AR1 through the word lines WL1 to WLN.

When receiving the enable signal EN and the first control signal DA_L, the first switch SW1 may turn off each of the pass gates PG1_L to PGN_L of the first pass gate group PGL. As each of the pass gates PG1_L to PGN_L of the first pass gate group PGL is turned off, the voltages applied to the global word lines GWL1 to GWLN might not be transferred to the memory cells MC1L to MCNL of the first area AR1.

That is, when the storage controller performs an operation on the second area AR2 of the memory block or processes the first area AR1 of the memory block as a fail area, the storage controller may output the first control signal DA_L to the memory block.

The second switch SW2 may be coupled to each of the pass gates PG1_R to PGN_R of the second pass gate group PGR. The second switch SW2 may turn off each of the pass gates PG1_R to PGN_R of the second pass gate group PGR based on the enable signal EN and the second control signal DA_R. For example, the second switch SW2 may be a high-voltage switch.

When receiving only the enable signal EN, the second switch SW2 may turn on each of the pass gates PG1_R to PGN_R of the second pass gate group PGR. As each of the pass gates PG1_R to PGN_R of the second pass gate group PGR is turned on, the voltages applied to the global word lines GWL1 to GWLN may be transferred to the memory cells MC1R to MCNR of the second area AR2 through the word lines WL1 to WLN.

When receiving the enable signal EN and the second control signal DA_R, the second switch SW2 may turn off each of the pass gates PG1_R to PGN_R of the second pass gate group PGR. As the pass gates PG1_R to PGN_R of the second pass gate group PGR are turned off, the voltages applied to the global word lines GWL1 to GWLN might not be transferred to the memory cells MC1R to MCNR of the second area AR2.

That is, when the storage controller performs an operation on the first area AR1 of the memory block or processes the second area AR2 of the memory block as a fail area, the storage controller may output the second control signal DA_R to the memory block.

Figure 5:
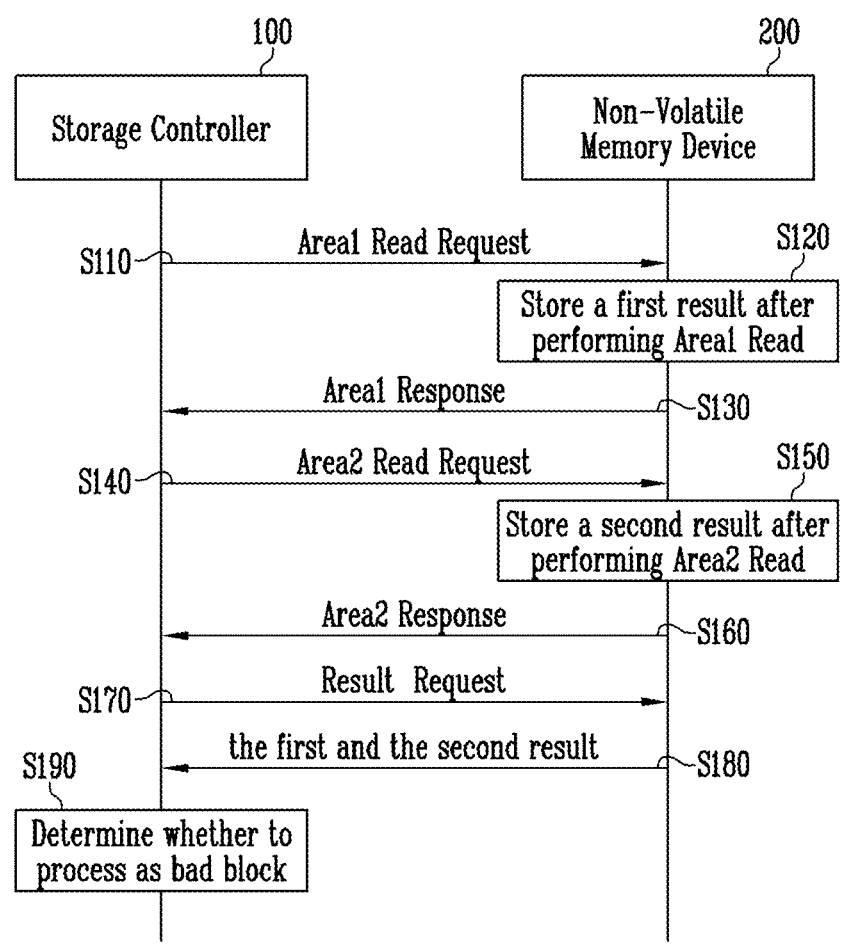
FIG. 5 is a flowchart for explaining a bad block check according to an embodiment of the present disclosure.

FIG. 5 is a flowchart for explaining a bad block check according to an embodiment of the present disclosure.

Referring to FIGS. 4 and 5, a method of operating the storage controller 100 and the non-volatile memory device 200, which perform a bad block check through a read operation on the target block including the first area AR1 and the second area AR2, will be described. The non-volatile memory device 200 of FIG. 5 may include the row decoder 220, the first area AR1, and the second area AR2, illustrated in FIG. 4. The storage controller 100 of FIG. 5 may include the bad block manager 110 of FIG. 2.

At step S110, the storage controller 100 may send a first area read request to the non-volatile memory device 200. The first area read request may be a request to perform a read operation on the first area AR1 of the target block and to prevent a read operation from being performed on the second area AR2. In some embodiments, the first area read request may include an enable signal EN and a second control signal DA_R.

In some embodiments, when a read retry operation on the target block fails, the storage controller 100 may perform step S110.

At step S120, the non-volatile memory device 200 may perform a read operation on the first area AR1. In some embodiments, the first switch SW1 may turn on each of the pass gates PG1_L to PGN_L of the first pass gate group PGL based on the enable signal EN. Accordingly, a voltage required for the read operation may be applied to the memory cells MC1L to MCNL of the first area AR1.

The second switch SW2 may turn off each of the pass gates PG1_R to PGN_R of the second pass gate group PGR based on the enable signal EN and the second control signal DA_R. Accordingly, the voltage required for the read operation might not be applied to the memory cells MC1R to MCNR of the second area AR2.

After the read operation has been performed on the first area AR1, the non-volatile memory device 200 may store a first result. The first result may indicate whether the read operation on the first area AR1 has succeeded. In some embodiments, the non-volatile memory device 200 may store the first result in the register.

At step S130, the non-volatile memory device 200 may send a first area response to the storage controller 100. The first area response may indicate that the non-volatile memory device 200 has performed the read operation on the first area AR1.

At step S140, the storage controller 100 may send a second area read request to the non-volatile memory device 200. The second area read request may be a request to perform a read operation on the second area AR2 of the target block and to prevent a read operation from being performed on the first area AR1. In some embodiments, the second area read request may include the enable signal EN and a first control signal DA_L.

At step S150, the non-volatile memory device 200 may perform a read operation on the second area AR2. In some embodiments, the second switch SW2 may turn on each of the pass gates PG1_R to PGN_R of the second pass gate group PGR based on the enable signal EN. Accordingly, the voltage required for the read operation may be applied to the memory cells MC1R to MCNR of the second area AR2.

The first switch SW1 may turn off the pass gates PG1_L to PGN_L of the first pass gate group PGL based on the enable signal EN and the first control signal DA_L. Accordingly, a voltage required for the read operation might not be applied to the memory cells MC1L to MCNL of the first area AR1.

After the read operation has been performed on the second area AR2, the non-volatile memory device 200 may store a second result. The second result may indicate whether the read operation on the second area AR2 has succeeded. In some embodiments, the non-volatile memory device 200 may store the second result in the register.

At step S160, the non-volatile memory device 200 may send a second area response to the storage controller 100. The second area response may indicate that the non-volatile memory device 200 has performed the read operation on the second area AR2.

At step S170, the storage controller 100 may send a result request to the non-volatile memory device 200.

At step S180, the non-volatile memory device 200 may send the first and second results to the storage controller 100 in response to the result request.

At step S190, the storage controller 100 may determine whether to process the target block as a bad block based on the first and second results. When the first result indicates a failed read operation and the second result indicates a successful read operation, the storage controller 100 may process the first area AR1 as a fail area. When the first area AR1 is processed as the fail area, the storage controller 100 might not perform a read operation or a program operation on the first area AR1 but may perform a read operation or a program operation on the second area AR2. In some embodiments, when the first area AR1 is processed as the fail area, the storage controller 100 may transmit the first control signal DA_L for blocking a voltage application to the first area upon performing the read operation on the target block.

When the first result indicates a successful read operation and the second result indicates a failed read operation, the storage controller 100 may process the second area AR2 as a fail area. When the second area AR2 is processed as the fail area, the storage controller 100 might not perform a read operation or a program operation on the second area AR2 but may perform a read operation or a program operation on the first area AR1. In some embodiments, when the second area AR2 is processed as the fail area, the storage controller 100 may transmit the second control signal DA_R for blocking a voltage application to the second area upon performing the read operation on the target block.

When the first result indicates a failed read operation and the second result indicates a failed read operation, the storage controller 100 may process the target block as a bad block.

Based on the results of the read operation on the first area AR1 and the second area AR2 of the target block, only the area having a reliability problem may be processed as a fail area, and an area that is not processed as a fail area may be continuously used. That is, based on the control signals for blocking a voltage application to respective areas, a defective area in the target block may be detected and only the use of the detected area may be blocked, thus enabling the memory device to be efficiently used without wasting the capacity of the memory device.

Figure 6:
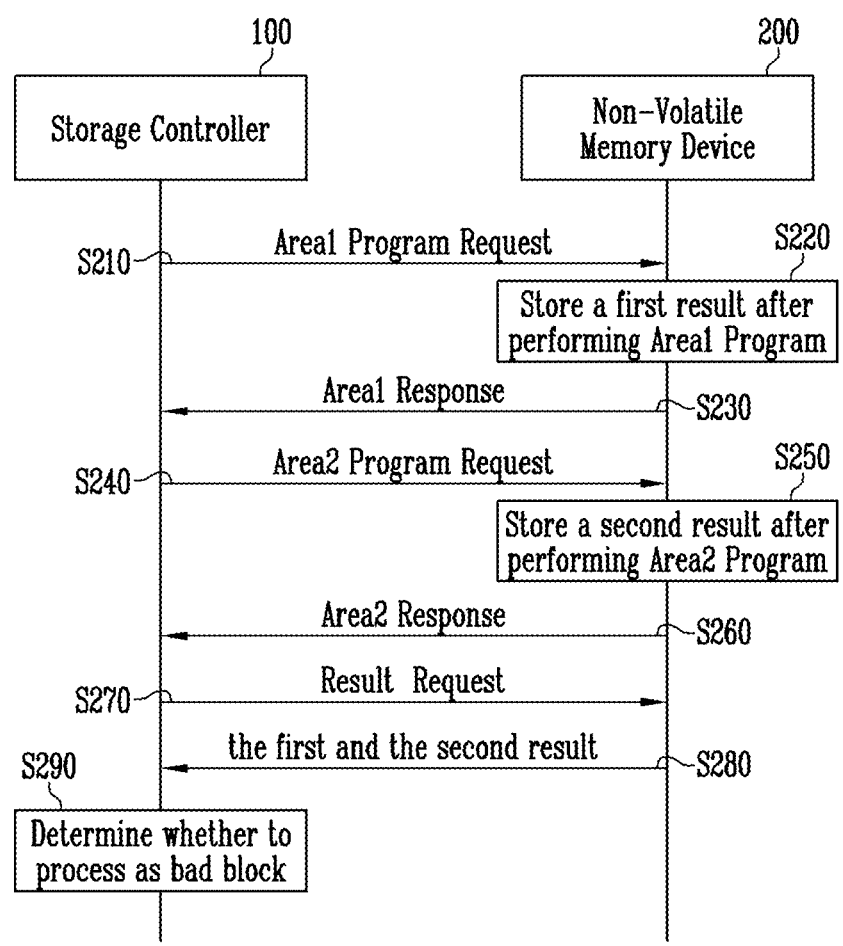
FIG. 6 is a flowchart for explaining a bad block check according to an embodiment of the present disclosure.

FIG. 6 is a flowchart for explaining a bad block check according to an embodiment of the present disclosure.

Referring to FIGS. 4 and 6, a method of operating the storage controller 100 and the non-volatile memory device 200, which perform a bad block check through a program operation on the target block including the first area AR1 and the second area AR2, will be described. The non-volatile memory device 200 of FIG. 6 may include the row decoder 220, the first area AR1, and the second area AR2 illustrated in FIG. 4. The storage controller 100 of FIG. 6 may include the bad block manager 110 of FIG. 2.

At step S210, the storage controller 100 may send a first area program request to the non-volatile memory device 200. The first area program request may be a request to perform a program operation on the first area AR1 of the target block and to prevent a program operation from being performed on the second area AR2. In some embodiments, the first area program request may include an enable signal EN and a second control signal DA_R.

In some embodiments, when the program operation on the target block fails, the storage controller 100 may perform an erase operation on the target block and may thereafter perform step S210.

At step S220, the non-volatile memory device 200 may perform a program operation on the first area AR1. In some embodiments, the first switch SW1 may turn on each of the pass gates PG1_L to PGN_L of the first pass gate group PGL based on the enable signal EN. Accordingly, a voltage required for the program operation may be applied to the memory cells MC1L to MCNL of the first area AR1.

The second switch SW2 may turn off each of the pass gates PG1_R to PGN_R of the second pass gate group PGR based on the enable signal EN and the second control signal DA_R. Accordingly, the voltage required for the program operation might not be applied to the memory cells MC1R to MCNR of the second area AR2.

After the program operation has been performed on the first area AR1, the non-volatile memory device 200 may store a first result. The first result may indicate whether the program operation on the first area AR1 has succeeded. In some embodiments, the non-volatile memory device 200 may store the first result in the register.

At step S230, the non-volatile memory device 200 may send a first area response to the storage controller 100. The first area response may indicate that the non-volatile memory device 200 has performed the program operation on the first area AR1.

At step S240, the storage controller 100 may send a second area program request to the non-volatile memory device 200. The second area program request may be a request to perform a program operation on the second area AR2 of the target block and to prevent a program operation from being performed on the first area AR1. In some embodiments, the second area program request may include the enable signal EN and a first control signal DA_L.

At step S250, the non-volatile memory device 200 may perform a program operation on the second area AR2. In some embodiments, the second switch SW2 may turn on each of the pass gates PG1_R to PGN_R of the second pass gate group PGR based on the enable signal EN. Accordingly, the voltage required for the program operation may be applied to the memory cells MC1R to MCNR of the second area AR2.

The first switch SW1 may turn off the pass gates PG1_L to PGN_L of the first pass gate group PGL based on the enable signal EN and the first control signal DA_L. Accordingly, a voltage required for the program operation might not be applied to the memory cells MC1L to MCNL of the first area AR1.

After the program operation has been performed on the second area AR2, the non-volatile memory device 200 may store a second result. The second result may indicate whether the program operation on the second area AR2 has succeeded. In some embodiments, the non-volatile memory device 200 may store the second result in the register.

At step S260, the non-volatile memory device 200 may send a second area response to the storage controller 100. The second area response may indicate that the non-volatile memory device 200 has performed the program operation on the second area AR2.

At step S270, the storage controller 100 may send a result request to the non-volatile memory device 200.

At step S280, the non-volatile memory device 200 may send the first and second results to the storage controller 100 in response to the result request.

At step S290, the storage controller 100 may determine whether to process the target block as a bad block depending on the first and second results. When the first result indicates a failed program operation and the second result indicates a successful program operation, the storage controller 100 may process the first area AR1 as a fail area. In some embodiments, when the first area AR1 is processed as the fail area, the storage controller 100 may transmit the first control signal DA_L for blocking a voltage application to the first area upon performing the program operation on the target block.

When the first result indicates a successful program operation and the second result indicates a failed program operation, the storage controller 100 may process the second area AR2 as a fail area. In some embodiments, when the second area AR2 is processed as the fail area, the storage controller 100 may transmit the second control signal DA_R for blocking a voltage application to the second area upon performing the program operation on the target block.

When the first result indicates a failed program operation and the second result indicates a failed program operation, the storage controller 100 may process the target block as a bad block.

Figure 7:
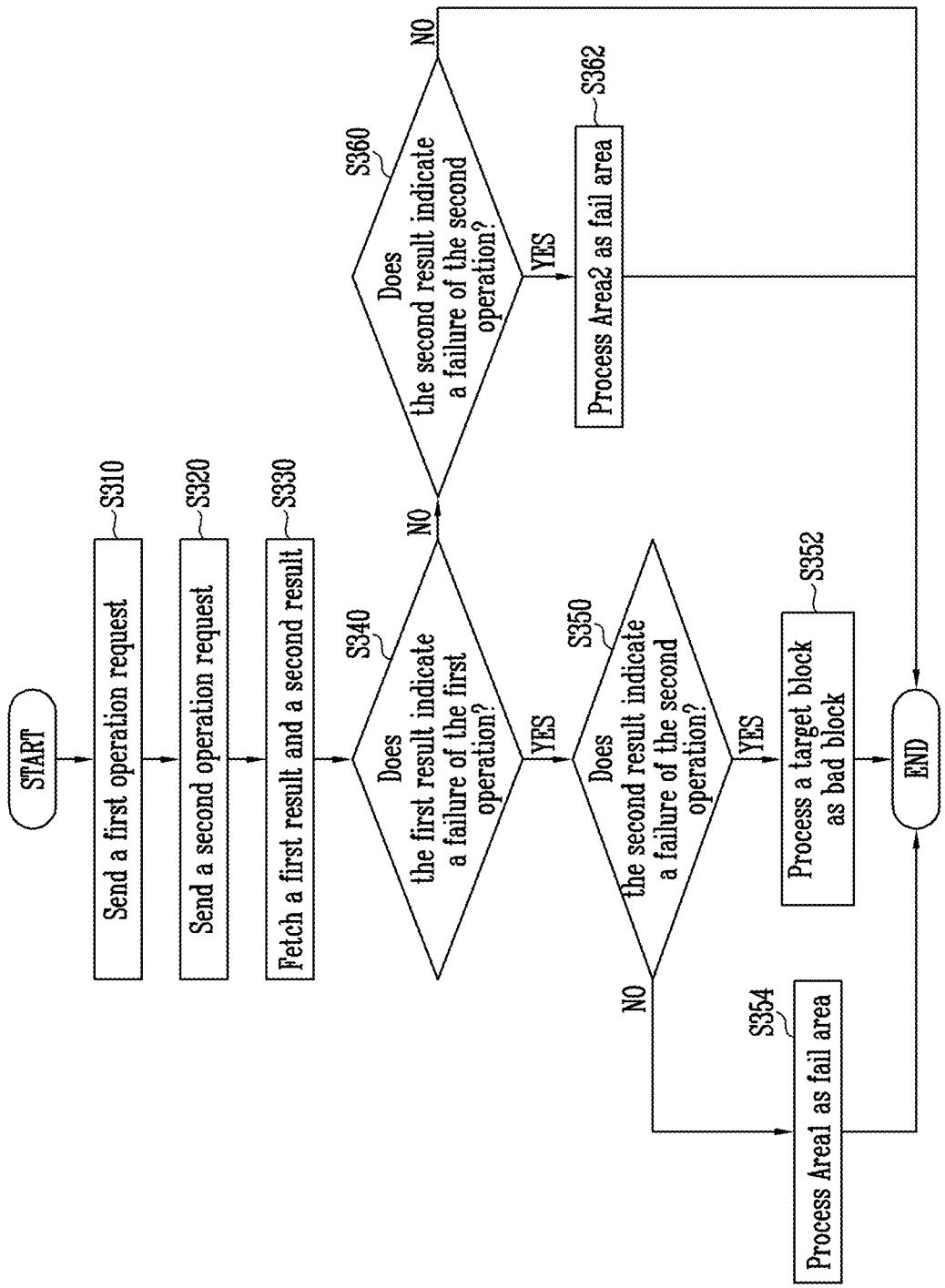
FIG. 7 is a flowchart illustrating a method of operating a storage controller according to an embodiment of the present disclosure.

FIG. 7 is a flowchart illustrating a method of operating a storage controller according to an embodiment of the present disclosure.

Referring to FIG. 7, an operation method in which the storage controller of FIG. 2 performs a bad block check will be described. The storage controller of FIG. 7 may correspond to the storage controller 100 of FIGS. 5 and 6.

At step S310, the storage controller 100 may send a first operation request to a non-volatile memory device. The first operation request may be a read request on the first area or a program request on the first area. In some embodiments, when a retry operation on the target block has failed, the storage controller 100 may send the first operation request to the non-volatile memory device. When the program operation on the target block fails, the storage controller 100 may perform an erase operation on the target block, after which the storage controller 100 may send the first operation request to the non-volatile memory device.

At step S320, the storage controller 100 may send a second operation request to the non-volatile memory device. The second operation request may be a read request on the second area or a program request on the second area.

At step S330, the storage controller 100 may fetch a first result and a second result from the non-volatile memory device. The first result may indicate whether the first operation on the first area has succeeded. The second result may indicate whether the second operation on the second area has succeeded.

At step S340, the storage controller 100 may check whether the first result indicates a failed first operation. When the first result indicates the failed first operation, the storage controller 100 may perform step S350. When the first result does not indicate a failed first operation, the storage controller 100 may perform step S360.

At step S350, the storage controller 100 may check whether the second result indicates a failed second operation. When the second result indicates the failed second operation, the storage controller 100 may perform step S352. When the second result does not indicate a failed second operation, the storage controller 100 may perform step S354. At step S352, the storage controller 100 may process the target block as a bad block. At step S354, the storage controller 100 may process the first area as a fail area.

At step S360, the storage controller 100 may check whether the second result indicates a failed second operation. When the second result indicates a failed second operation, the storage controller 100 may perform step S362. When the second result does not indicate a failed second operation, the storage controller 100 may perform step S364. At step S362, the storage controller 100 may process the second area as a fail area. At step S364, the storage controller 100 may terminate the bad block check.

Although it is disclosed that the storage controller 100 performs the step of checking whether the first result indicates a failed first operation earlier than the step of checking whether the second result indicates a failed second operation, the present disclosure is not limited thereto, and the storage controller 100 may perform the step of checking whether the second result indicates a failed second operation earlier than the step of checking whether the first result indicates a failed first operation. Furthermore, the storage controller 100 may simultaneously perform the step of checking whether the first result indicates a failed first operation and the step of checking whether the second result indicates a failed second operation.

Figure 8:
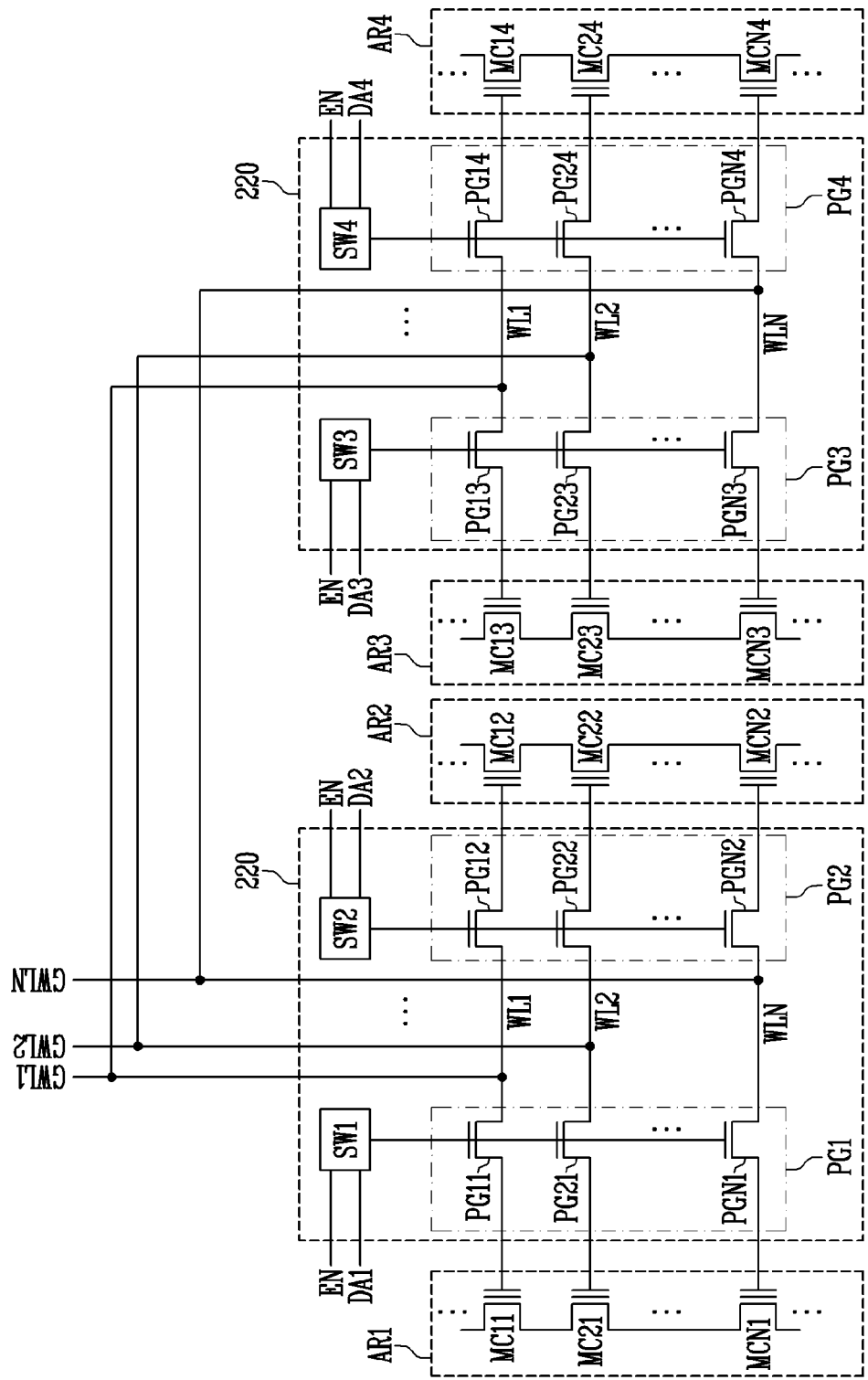
FIG. 8 is a circuit diagram illustrating a memory block including a plurality of areas.

FIG. 8 is a circuit diagram illustrating a memory block including a plurality of areas.

Referring to FIG. 8, a first area AR1, a second area AR2, a third area AR3, and a fourth area AR4 of a target block and a row decoder 220 are illustrated.

Each of the first to fourth areas AR1 to AR4 may include memory cells of the target block. The first area AR1 may include first to N-th memory cells MC11 to MCN1, the second area AR2 may include first to N-th memory cells MC12 to MCN2, the third area AR3 may include first to N-th memory cells MC13 to MCN3, and the fourth area AR4 may include first to N-th memory cells MC14 to MCN4.

The first to N-th memory cells MC11 to MCN1 of the first area AR1, the first to N-th memory cells MC12 to MCN2 of the second area AR2, the first to N-th memory cells MC13 to MCN3 of the third area AR3, and the first to N-th memory cells MC14 to MCN4 of the fourth area AR4 may be coupled to identical word lines, respectively. In other words, the first memory cells MC11 of the first areas to the first memory cells MC14 of the fourth areas may be coupled to the same first word line WL1, the second memory cells MC21 of the first areas to the second memory cells MC24 of the fourth areas may be coupled to the same second word line WL2, and so on.

For example, the first memory cell MC11 of the first area AR1, the first memory cell MC12 of the second area AR2, the first memory cell MC13 of the third area AR3, and the first memory cell MC14 of the fourth AR4 area may be coupled to a first word line WL1. The second memory cell MC21 of the first area AR1, the second memory cell MC22 of the second area AR2, the second memory cell MC23 of the third area AR3, and the second memory cell MC24 of the fourth AR4 area may be coupled to a second word line WL2. The N-th memory cell MCN1 of the first area AR1, the N-th memory cell MCN2 of the second area AR2, the N-th memory cell MCN3 of the third area AR3, and the N-th memory cell MCN4 of the fourth AR4 area may be coupled to an N-th word line WLN.

The first to N-th word lines WL1 to WLN may be coupled to first to N-th global word lines GWL1 to GWLN, respectively. For example, the first word line WL1 may be coupled to the first global word line GWL1, the second word line WL2 may be coupled to the second global word line GWL2, and the N-th word line WLN may be coupled to the N-th global word line GWLN.

The first to N-th global word lines GWL1 to GWLN may apply voltages to the first to N-th word lines WL1 to WLN, respectively. The first to N-th word lines WL1 to WLN may output the applied voltages to the first to N-th memory cells MC11 to MCN1 of the first area AR1, respectively, through a first pass gate group PG1. The first to N-th word lines WL1 to WLN may output the applied voltages to the first to N-th memory cells MC12 to MCN2 of the second area AR2, respectively, through a second pass gate group PG2. The first to N-th word lines WL1 to WLN may output the applied voltages to the first to N-th memory cells MC13 to MCN3 of the third area AR3, respectively, through a third pass gate group PG3. Furthermore, the first to N-th word lines WL1 to WLN may output the applied voltages to the first to N-th memory cells MC14 to MCN4 of the fourth area AR4, respectively, through a fourth pass gate group PG4.

The row decoder 220 may include the first pass gate group PG1, the second pass gate group PG2, the third pass gate group PG3, the fourth pass gate group PG4, a first switch SW1, a second switch SW2, a third switch SW3, and a fourth switch SW4.

The first pass gate group PG1 may include first to N-th pass gates PG11 to PGN1. The first to N-th pass gates PG11 to PGN1 may be coupled to the first to N-th memory cells MC11 to MCN1, respectively, in the first area AR1.

The first switch SW1 may be coupled to each of the pass gates PG11 to PGN1 of the first pass gate group PG1. The first switch SW1 may turn off each of the pass gates PG11 to PGN1 of the first pass gate group PG1 based on an enable signal EN and a first control signal DA1. For example, the first switch SW1 may be a high-voltage switch.

When receiving only the enable signal EN, the first switch SW1 may turn on each of the pass gates PG11 to PGN1 of the first pass gate group PG1. As each of the pass gates PG11 to PGN1 of the first pass gate group PG1 is turned on, the voltages applied to the global word lines GWL1 to GWLN may be transferred to the memory cells MC11 to MCN1 of the first area AR1 through the word lines WL1 to WLN.

When receiving the enable signal EN and the first control signal DA1, the first switch SW1 may turn off each of the pass gates PG11 to PGN1 of the first pass gate group PG1. As each of the pass gates PG11 to PGN1 of the first pass gate group PG1 is turned off, the voltages applied to the global word lines GWL1 to GWLN might not be transferred to the memory cells MC11 to MCN1 of the first area AR1.

The second switch SW2 may be coupled to each of the pass gates PG12 to PGN2 of the second pass gate group PG2. The second switch SW2 and the first switch SW1 may be operated in a similar manner. When receiving the enable signal EN and a second control signal DA2, the second switch SW2 may turn off each of the pass gates PG12 to PGN2 of the second pass gate group PG2. When receiving the enable signal EN, the second switch SW2 may turn on each of the pass gates PG12 to PGN2 of the second pass gate group PG2. For example, the second switch SW2 may be a high-voltage switch.

The third switch SW3 may be coupled to each of the pass gates PG13 to PGN3 of the third pass gate group PG3. The third switch SW3 and the first switch SW1 may be operated in a similar manner. When receiving the enable signal EN and a third control signal DA3, the third switch SW3 may turn off each of the pass gates PG13 to PGN3 of the third pass gate group PG3. When receiving the enable signal EN, the third switch SW3 may turn on each of the pass gates PG13 to PGN3 of the third pass gate group PG3. For example, the third switch SW3 may be a high-voltage switch.

The fourth switch SW4 may be coupled to each of the pass gates PG14 to PGN4 of the fourth pass gate group PG4. The fourth switch SW4 and the first switch SW1 may be operated in a similar manner. When receiving the enable signal EN and a fourth control signal DA4, the fourth switch SW4 may turn off each of the pass gates PG14 to PGN4 of the fourth pass gate group PG4. When receiving the enable signal EN, the fourth switch SW4 may turn on each of the pass gates PG14 to PGN4 of the fourth pass gate group PG4. For example, the fourth switch SW4 may be a high-voltage switch.

Although the target block including the first to fourth areas AR1 to AR4 is illustrated, the present disclosure is not limited thereto, and the target block may include more than four areas.

Figure 9:
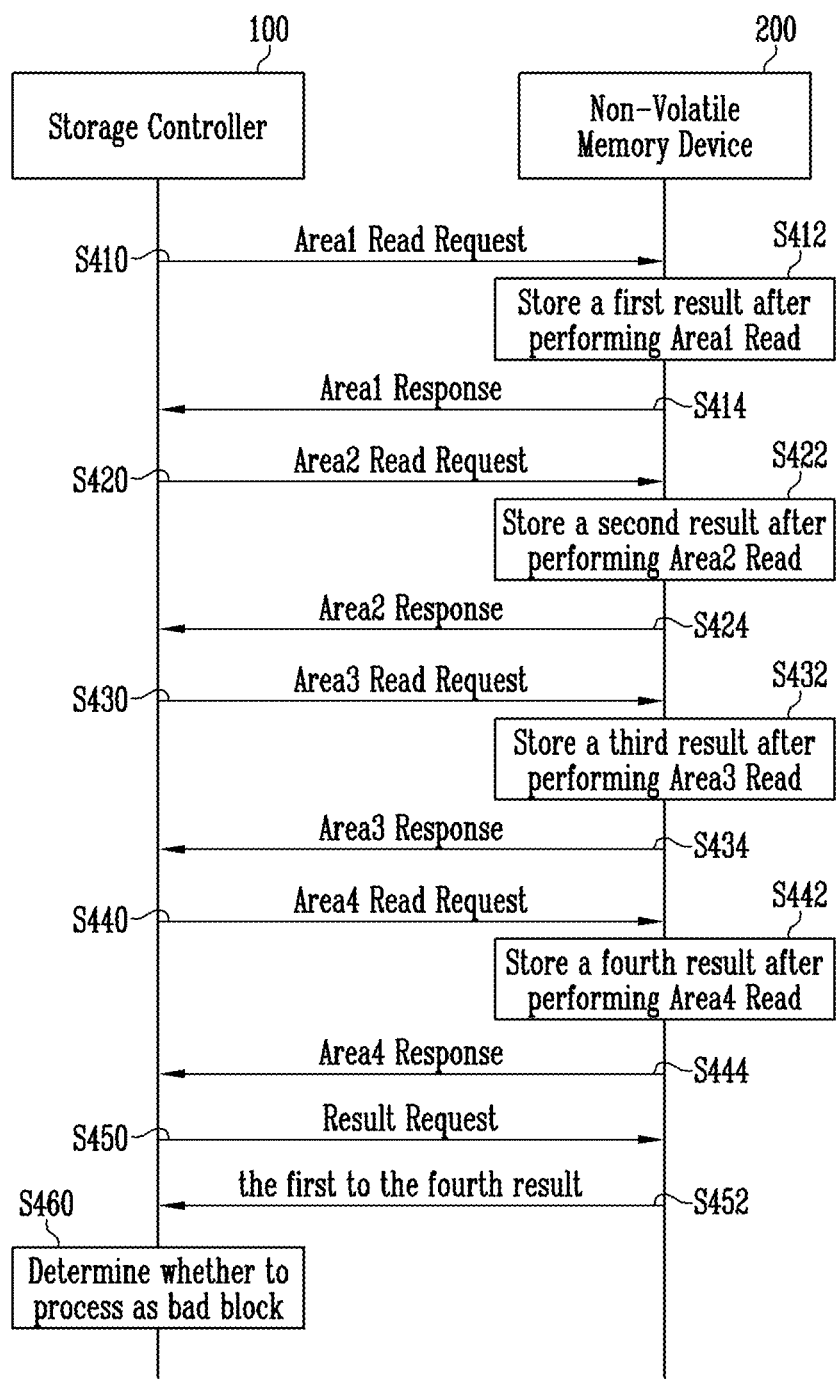
FIG. 9 is a flowchart illustrating a method of operating a storage controller according to an embodiment of the present disclosure.

FIG. 9 is a flowchart illustrating a method of operating a storage controller according to an embodiment of the present disclosure.

Referring to FIGS. 8 and 9, a method of operating the storage device, which performs a bad block check through a read operation on the target block including the first area AR1 to the fourth area AR4, will be described. The non-volatile memory device 200 of FIG. 9 may include the row decoder 220 and the first area AR1 to the fourth area AR4 illustrated in FIG. 8. The storage controller 100 of FIG. 9 may include the bad block manager 110 of FIG. 2.

At step S410, the storage controller 100 may send a first area read request to the non-volatile memory device 200. The first area read request may be a request to perform a read operation on the first area AR1 of the target block and to prevent a read operation from being performed on the second to fourth areas AR2 to AR4. In some embodiments, the first area read request may include an enable signal EN, a second control signal DA2, a third control signal DA3, and a fourth control signal DA4.

In some embodiments, when a read retry operation on the target block fails, the storage controller 100 may perform step S410.

At step S412, the non-volatile memory device 200 may perform a read operation on the first area AR1. In some embodiments, the first switch SW1 may turn on each of the pass gates PG11 to PGN1 of the first pass gate group PG1 based on the enable signal EN. Accordingly, a voltage required for the read operation may be applied to the memory cells MC11 to MCN1 of the first area AR1.

The second switch SW2 may turn off each of the pass gates PG12 to PGN2 of the second pass gate group PG2 based on the enable signal EN and the second control signal DA2. The third switch SW3 may turn off each of the pass gates PG13 to PGN3 of the third pass gate group PG3 based on the enable signal EN and the third control signal DA3. The fourth switch SW4 may turn off each of the pass gates PG14 to PGN4 of the fourth pass gate group PG4 based on the enable signal EN and the fourth control signal DA4.

After the read operation has been performed on the first area AR1, the non-volatile memory device 200 may store a first result. The first result may indicate whether the read operation on the first area AR1 has succeeded. In some embodiments, the non-volatile memory device 200 may store the first result in the register.

At step S414, the non-volatile memory device 200 may send a first area response to the storage controller 100. The first area response may indicate that the non-volatile memory device 200 has performed the read operation on the first area AR1.

At step S420, the storage controller 100 may send a second area read request to the non-volatile memory device 200. The second area read request may be a request to perform a read operation on the second area AR2 of the target block and to prevent a read operation from being performed on the first, third, and fourth areas AR1, AR3, and AR4. In some embodiments, the second area read request may include the enable signal EN, the first control signal DA1, the third control signal DA3, and the fourth control signal DA4.

At step S422, the non-volatile memory device 200 may perform a read operation on the second area AR2. In some embodiments, the second switch SW2 may turn on each of the pass gates PG12 to PGN2 of the second pass gate group PG2 based on the enable signal EN. Accordingly, the voltage required for the read operation may be applied to the memory cells MC12 to MCN2 of the second area AR2.

The first switch SW1 may turn off each of the pass gates PG11 to PGN1 of the first pass gate group PG1 based on an enable signal EN and a first control signal DA1. The third switch SW3 may turn off each of the pass gates PG13 to PGN3 of the third pass gate group PG3 based on the enable signal EN and the third control signal DA3. The fourth switch SW4 may turn off each of the pass gates PG14 to PGN4 of the fourth pass gate group PG4 based on the enable signal EN and the fourth control signal DA4. After the read operation has been performed on the second area AR2, the non-volatile memory device 200 may store a second result. The second result may indicate whether the read operation on the second area AR2 has succeeded. In some embodiments, the non-volatile memory device 200 may store the second result in the register.

At step S424, the non-volatile memory device 200 may send a second area response to the storage controller 100. The second area response may indicate that the non-volatile memory device 200 has performed the read operation on the second area AR2.

At step S430, the storage controller 100 may send a third area read request to the non-volatile memory device 200. The third area read request may be a request to perform a read operation on the third area AR3 of the target block and to prevent a read operation from being performed on the first, second, and fourth areas AR1, AR2, and AR4. In some embodiments, the third area read request may include the enable signal EN, the first control signal DA1, the second control signal DA2, and the fourth control signal DA4.

At step S432, the non-volatile memory device 200 may perform a read operation on the third area AR3. In some embodiments, the third switch SW3 may turn on each of the pass gates PG13 to PGN3 of the third pass gate group PG3 based on the enable signal EN. Accordingly, the voltage required for the read operation may be applied to the memory cells MC13 to MCN3 of the third area AR3.

The first switch SW1 may turn off each of the pass gates PG11 to PGN1 of the first pass gate group PG1 based on the enable signal EN and the first control signal DA1. The second switch SW2 may turn off each of the pass gates PG12 to PGN2 of the second pass gate group PG2 based on the enable signal EN and the second control signal DA2. The fourth switch SW4 may turn off each of the pass gates PG14 to PGN4 of the fourth pass gate group PG4 based on the enable signal EN and the fourth control signal DA4.

After the read operation has been performed on the third area AR3, the non-volatile memory device 200 may store a third result. The third result may indicate whether the read operation on the third area AR3 has succeeded. In some embodiments, the non-volatile memory device 200 may store the third result in the register.

At step S434, the non-volatile memory device 200 may send a third area response to the storage controller 100. The third area response may indicate that the non-volatile memory device 200 has performed the read operation on the third area AR3.

At step S440, the storage controller 100 may send a fourth area read request to the non-volatile memory device 200. The fourth area read request may be a request to perform a read operation on the fourth area AR4 of the target block and to prevent a read operation from being performed on the first to third areas AR1 to AR3. In some embodiments, the fourth area read request may include the enable signal EN, the first control signal DA1, the second control signal DA2, and the third control signal DA3.

At step S442, the non-volatile memory device 200 may perform a read operation on the fourth area AR4. In some embodiments, the fourth switch SW4 may turn on each of the pass gates PG14 to PGN4 of the fourth pass gate group PG4 based on the enable signal EN. Accordingly, the voltage required for the read operation may be applied to the memory cells MC14 to MCN4 of the fourth area AR4.

The first switch SW1 may turn off each of the pass gates PG11 to PGN1 of the first pass gate group PG1 based on the enable signal EN and the first control signal DA1. The second switch SW2 may turn off each of the pass gates PG12 to PGN2 of the second pass gate group PG2 based on the enable signal EN and the second control signal DA2. The third switch SW3 may turn off each of the pass gates PG13 to PGN3 of the third pass gate group PG3 based on the enable signal EN and the third control signal DA3.

After the read operation has been performed on the fourth area AR4, the non-volatile memory device 200 may store a fourth result. The fourth result may indicate whether the read operation on the fourth area AR4 has succeeded. In some embodiments, the non-volatile memory device 200 may store the fourth result in the register.

At step S444, the non-volatile memory device 200 may send a fourth area response to the storage controller 100. The fourth area response may indicate that the non-volatile memory device 200 has performed the read operation on the fourth area AR4.

At step S450, the storage controller 100 may send a result request to the non-volatile memory device 200.

At step S452, the non-volatile memory device 200 may send the first to fourth results to the storage controller 100 in response to the result request.

At step S460, the storage controller 100 may determine whether to process the target block as a bad block depending on the first to fourth results. The storage controller 100 may process an area, corresponding to a result indicating a failed read operation among the first to fourth results, as a fail area.

For example, when the first and second results indicate a failed read operation and the third and fourth results indicate a successful read operation, the storage controller 100 may process the first and second areas as fail areas. When the first and second areas are processed as the fail areas, the storage controller 100 may transmit first and second control signals for blocking a voltage application to the first and second areas upon performing a read operation on the target block. That is, the storage controller 100 may perform a read operation on the third and fourth areas.

When the third result indicates a failed read operation and the first, second, and fourth results indicate a successful read operation, the storage controller 100 may process the third area as a fail area. When the third area is processed as the fail area, the storage controller 100 may transmit a third control signal for blocking a voltage application to the third area upon performing a read operation on the target block. That is, the storage controller 100 may perform a read operation on the first, second, and fourth areas.

When all of the first to fourth results indicate a failed read operation, storage controller 100 may process the target block as a bad block.

Although the method of operating the storage device, which performs a bad block check through a read operation on the target block including the first to fourth areas AR1 to AR4, has been described, the present disclosure is not limited thereto, and the storage controller 100 may perform a bad block check through a program operation on the target block including the first to fourth areas AR1 to AR4.

In some embodiments, the storage controller 100 may determine whether to process the target block as a bad block based on the first result indicating whether the program operation on the first area AR1 has succeeded, the second result indicating whether the program operation on the second area AR2 has succeeded, the third result indicating whether the program operation on the third area AR3 has succeeded, and the fourth result indicating whether the program operation on the fourth area AR4 has succeeded.

The present disclosure includes a memory device and a storage controller, which perform a bad block area check. The present disclosure may detect an area in which an operation is normally performed among areas in a bad block and may use the detected area, thus improving the efficiency of a storage device.

What is claimed is:

1. A memory device, comprising:
   a first area including a first memory cell coupled to a first pass gate;
   a second area including a second memory cell coupled to a second pass gate, the first pass gate and the second pass gate coupled to an identical word line, the first memory cell and the second memory cell coupled to the identical word line through the first pass gate and the second pass gate; and
   a control circuit configured to perform a first operation on the first area and a second operation on the second area and configured to store a first result indicating whether the first operation has succeeded and a second result indicating whether the second operation has succeeded.

2. The memory device according to claim 1,
   wherein, when the first result indicates a failed first operation on the first area and the second result indicates a successful second operation on the second area, the first area is processed as a fail area,
   wherein, when the first result indicates a successful first operation and the second result indicates a failed second operation, the second area is processed as a fail area, and
   wherein, when the first result indicates the failed first operation and the second result indicates the failed second operation, a memory block including the first area and the second area is processed as a bad block.

3. The memory device according to claim 1, further comprising:
   a voltage generating circuit configured to generate a first voltage and a second voltage; and
   a decoder configured to apply the first voltage to the first area when the first operation is performed and configured to apply the second voltage to the second area when the second operation is performed.

4. The memory device according to claim 3, wherein the control circuit is configured to:
output an enable signal and a first control signal for blocking a voltage application to the first area to the decoder when the second operation is performed, and
output the enable signal and a second control signal for blocking a voltage application to the second area to the decoder when the first operation is performed.

5. The memory device according to claim 4, wherein the decoder comprises:
the first pass gate;
a first switch configured to turn on the first pass gate when the enable signal is received and configured to turn off the first pass gate when the first control signal is received;
the second pass gate; and
a second switch configured to turn on the second pass gate when the enable signal is received and configured to turn off the second pass gate when the second control signal is received.

6. The memory device according to claim 1,
wherein the first operation is one of a program operation on the first area and a read operation on the first area, and
wherein the second operation is one of a program operation on the second area and a read operation on the second area.

7. The memory device according to claim 1, further comprising:
a third area including a third memory cell coupled to the identical word line; and
a fourth area including a fourth memory cell coupled to the identical word line,
wherein the control circuit is configured to perform a third operation on the third area and a fourth operation on the fourth area and configured to store a third result indicating whether the third operation has succeeded and a fourth result indicating whether the fourth operation has succeeded.

8. A method of operating a storage controller communicating with a non-volatile memory device including a target block, the method comprising:
sending a first request for a first area of the target block to the non-volatile memory device;
sending a second request for a second area of the target block to the non-volatile memory device; and
determining whether to process the target block as a bad block based on a first result indicating whether a first operation corresponding to the first request has succeeded and a second result indicating whether a second operation corresponding to the second request has succeeded,
wherein the first area includes memory cells coupled to a first pass gate group among memory cells of the target block,
wherein the second area includes memory cells coupled to a second pass gate group among the memory cells of the target block, and
wherein a plurality of pass gates in the first pass gate group and a plurality of pass gates in the second pass gate group are coupled to identical word lines, respectively.

9. The method according to claim 8, wherein determining whether to process the target block as the bad block based on the first result and the second result comprises:

when the first result indicates a failed first operation, checking whether the second result indicates a failed second operation; and
when the second result indicates the failed second operation, processing the target block as the bad block.

10. The method according to claim 9, further comprising:
processing, by the storage controller, the first area as a fail area when the second result indicates a successful second operation.

11. The method according to claim 9, further comprising:
when the first result indicates a successful first operation, checking whether the second result indicates the failed second operation; and
when the second result indicates the failed second operation, processing the second area as a fail area.

12. The method according to claim 9, wherein sending the second request for the second area of the target block to the non-volatile memory device comprises sending the second request to the non-volatile memory device based on reception of a response to the first request from the non-volatile memory device.

13. The method according to claim 9,
wherein the first operation is one of a read operation on the first area and a program operation on the first area, and
wherein the second operation is one of a read operation on the second area and a program operation on the second area.

14. The method according to claim 13, wherein, when the first operation is the read operation on the first area and the second operation is the read operation on the second area, sending the first request for the first area of the target block to the non-volatile memory device comprises:
performing a read-retry operation on the target block; and
when the read-retry operation fails, sending the first request for the first area of the target block to the non-volatile memory device.

15. The method according to claim 13, wherein, when the first operation is the program operation on the first area and the second operation is the program operation on the second area, sending the first request for the first area of the target block to the non-volatile memory device comprises:
performing the program operation on the target block;
when the program operation fails, performing an erase operation on the target block; and
after the erase operation has been performed, sending the first request for the first area of the target block to the non-volatile memory device.

16. The method according to claim 8,
wherein the first request includes a signal for turning off each of the plurality of pass gates of the second pass gate group, and
wherein the second request includes a signal for turning off each of the plurality of pass gates of the first pass gate group.

17. A method of operating a memory device including a memory block including a first area and a second area, the method comprising:
performing a first operation corresponding to the first area;
storing a first result indicating whether the first operation has succeeded;
after storing the first result, performing a second operation corresponding to the second area;
storing a second result indicating whether the second operation has succeeded; and processing at least one of the first area and the second area as a fail area based on the first and second results, wherein the first area includes memory cells coupled to a first pass gate group, among memory cells of the memory block, wherein the second area includes memory cells coupled to a second pass gate group, among the memory cells of the memory block, and wherein a plurality of pass gates in the first pass gate group and a plurality of pass gates in the second pass gate group are coupled to identical word lines, respectively.

18. The method according to claim 17, wherein the memory device comprises:

a control circuit configured to perform the first operation and the second operation and store the first result and the second result;

a voltage generating circuit configured to generate a first voltage and a second voltage; and a decoder configured to apply the first voltage to the first area when the first operation is performed and configured to apply the second voltage to the second area when the second operation is performed.

19. The method according to claim 17, wherein the first operation is one of a read operation on the first area and a program operation on the first area, and wherein the second operation is one of a read operation on the second area and a program operation on the second area.

20. The method according to claim 17, further comprising:

when the first result indicates a failed first operation and the second result indicates a successful second operation, processing the first area as a fail area;

when the first result indicates a successful first operation and the second result indicates a failed second operation, processing the second area as the fail area; and when the first result indicates the failed first operation and the second result indicates the failed second operation, processing the memory block as a bad block.

\* \* \* \* \*